United States Patent [19]

Williams

[11] Patent Number: 4,515,562

[45] Date of Patent: May 7, 1985

[54] APPARATUS FOR APPLYING HEAT TO A PORTION OF A PIPELINE

[75] Inventor: John P. Williams, Williton, Nr. Taunton, England

[73] Assignee: British Gas Corporation, London, England

[21] Appl. No.: 645,341

[22] Filed: Aug. 29, 1984

Related U.S. Application Data

[63] Continuation of Ser. No. 433,645, Oct. 12, 1982, abandoned.

[30] Foreign Application Priority Data

Oct. 12, 1981 [GB] United Kingdom ............... 8130701

[51] Int. Cl.³ .............................. F28F 7/00; F24J 3/00
[52] U.S. Cl. .................................. 432/225; 432/226; 432/231
[58] Field of Search ............... 432/225, 224, 226, 227, 432/231; 126/271.1

[56] References Cited

U.S. PATENT DOCUMENTS

| | | | |
|---|---|---|---|
| 3,679,189 | 7/1972 | Deal et al. | 432/226 |
| 3,807,077 | 4/1974 | Deck et al. | 432/226 |
| 3,813,215 | 5/1974 | Ward | 432/231 |
| 3,829,284 | 8/1974 | Hemingway et al. | 432/231 |
| 3,833,338 | 9/1974 | Badrock | 432/225 |
| 4,088,439 | 5/1978 | Dohren | 432/185 |
| 4,212,629 | 7/1980 | Nagasaka et al. | 432/226 |
| 4,239,486 | 12/1980 | Gomez | 432/226 |
| 4,255,137 | 3/1981 | Guyer | 432/226 |
| 4,256,452 | 3/1981 | Goss et al. | 432/226 |
| 4,311,457 | 1/1982 | Hayakawa et al. | 432/225 |
| 4,449,925 | 5/1984 | Williams et al. | 432/226 |

Primary Examiner—Henry C. Yuen
Attorney, Agent, or Firm—Larson and Taylor

[57] ABSTRACT

The present invention relates to apparatus for applying heat to a portion of a pipeline, particularly a pipeline carrying natural gas, for the purpose of curing a heat shrinkable plastic sleeve used to repair leaks in the pipeline wall. The apparatus comprises an elongate manifold 1 for mounting on the pipeline and having an inlet 5 to receive hot gas from a forced draught gas burner 6 and an outlet 8 to discharge the hot gas along the portion of the pipeline. The apparatus also comprises a flexible blanket 2 of a heat insulated material such as illuminated glass wool and having one edge 71 for securing to the manifold 1 so that the blanket 2 can be wrapped around the portion of the pipeline to form therearound a heat shroud having openings 75 and 76 respectively to receive hot gas from the manifold outlet 8 and to discharge the gas after circulation around the wall of the pipeline 26.

15 Claims, 6 Drawing Figures

APPARATUS FOR APPLYING HEAT TO A PORTION OF A PIPELINE

This application is a continuation, of application Ser. No. 433,645 filed Oct. 12, 1982, abandoned.

FIELD OF THE INVENTION

This invention relates to apparatus for applying heat to a portion of a pipeline particularly for the purpose of curing a heat shrinkable sleeve used to repair leaks chiefly at pipeline joints.

SUMMARY OF THE INVENTION

In the repair of leaks in pipelines carrying a fuel such as natural gas, one commonly used technique involves forming around the pipeline wall a sleeve of a heat-shrinkable plastics material to enclose the leak and then heating the material so that it shrinks to form a gas tight seal around the wall. Because of the inflammable nature of the gas, the use of open flame torches to heat the pipe or the sleeve is prohibited. Safer forms of heating devices not utilising an open flame are available but these are bulky and rigid so that their use is significantly limited in those not infrequent instances where access to the gas main or pipe is restricted by other underground plant.

BRIEF DESCRIPTION OF THE DRAWINGS

It is therefore an object of the present invention to provide a heating apparatus which overcomes the disadvantages of the conventionally available heaters.

According therefore to the present invention, there is provided apparatus for applying heat to a portion of a pipeline, the apparatus comprising an elongate manifold for mounting on the pipeline, the manifold having an inlet to receive hot gas and an outlet to discharge the gas along the portion of the pipeline and a flexible blanket of heat insulated material having one edge for securing to the manifold so that the blanket can be wrapped around the portion of the pipeline to form therearound a heat shroud having openings respectively to receive hot gas from the manifold outlet and to discharge the gas after circulation around the wall of the pipeline.

Preferably the manifold outlet comprises an elongated slot.

Suitably the ends of the manifold are secured to mountings adapted to locate the manifold on the pipeline wall.

Conveniently the manifold is adapted for swivelling axially on its mountings so that the position of the manifold outlet can be varied to direct gas into either of the openings in the heat shroud.

Preferably one of the mountings includes two pivotably connected portions, one of which is secured to the manifold so that when in situ on the pipeline the manifold can be tilted away from the pipeline by pivotting at one end about the other portion of the mounting.

Suitably the mounting portions include releasable locking means for locking the manifold in its tilted position.

Conveniently the other portion of the mounting includes means for releasably securing the apparatus to the pipeline.

Preferably means extending between the mounting is provided to space a portion of the blanket from the pipeline when the blanket is wrapped around the pipeline.

Suitably the spacing means is adapted to adjust the spacing between the blanket and the pipeline.

Conveniently the mountings are provided with means for securing the other edge of the blanket after it has been wrapped around the pipe wall.

Preferably the manifold inlet communicates with the outlet by way of an elongated plenum chamber.

Suitably the manifold inlet is a circular pipe to locate the circular outlet of a burner.

Preferably those edges of the blanket forming the edges of the heat shroud are gathered so that their length is reduced in comparison to the actual length of the blanket to enable the edges to grip the wall of a pipe of a suitably selected diameter.

Suitably the blanket is provided with a series of eyes extending along the edges of the blanket which are to form the heat shroud and a cord is threaded alternately through each series of eyes to pull the edges towards the pipeline when the blanket is wrapped therearound.

Figure 1:
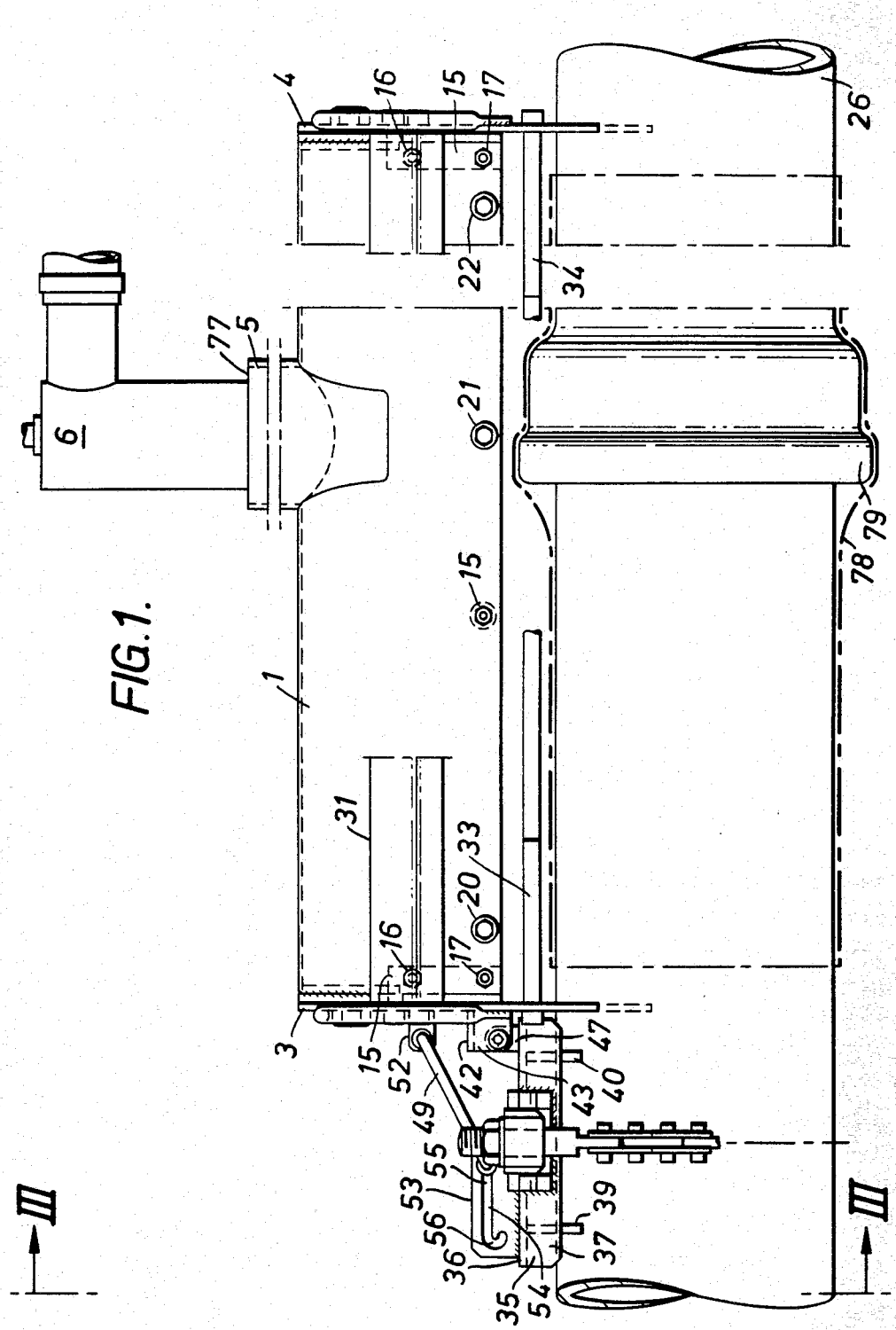
Figure 2:
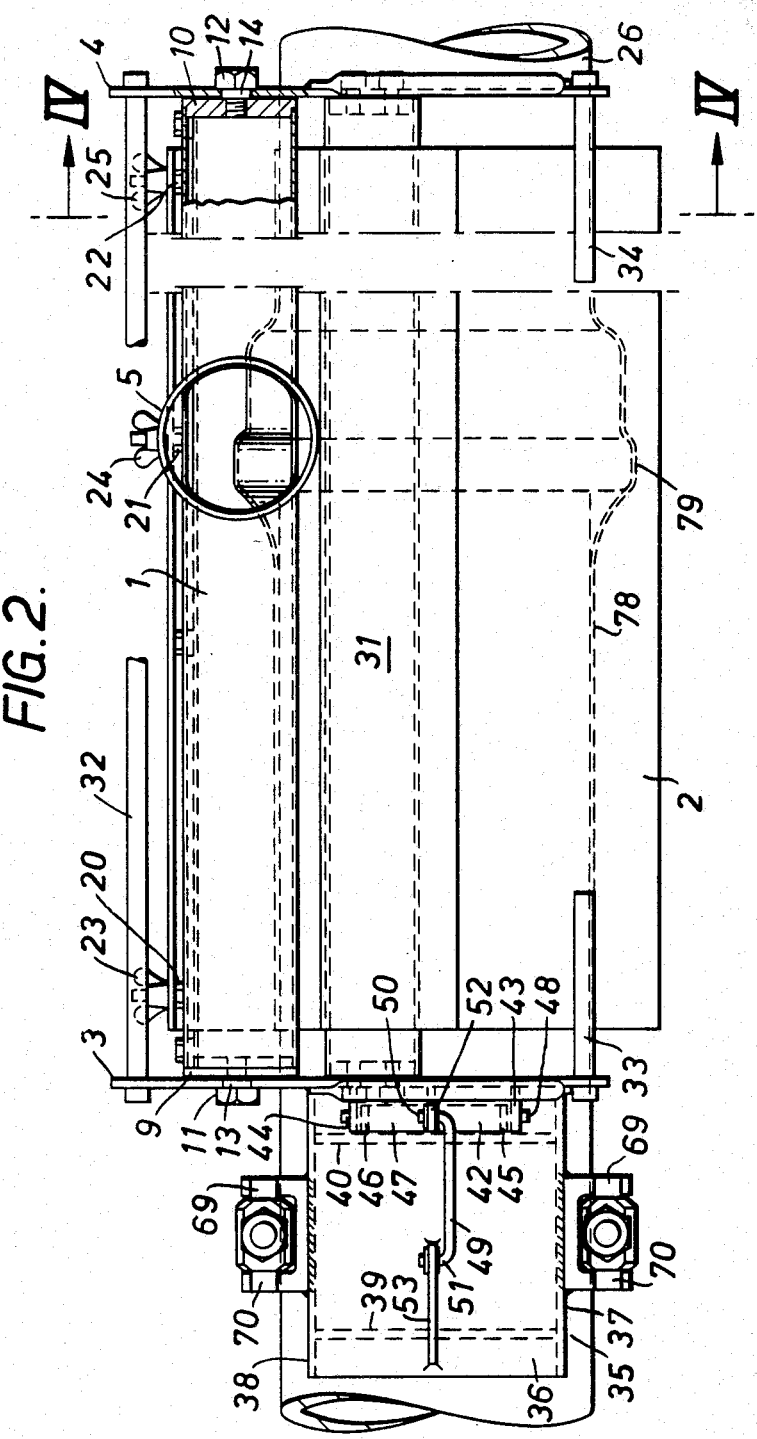
Figure 3:
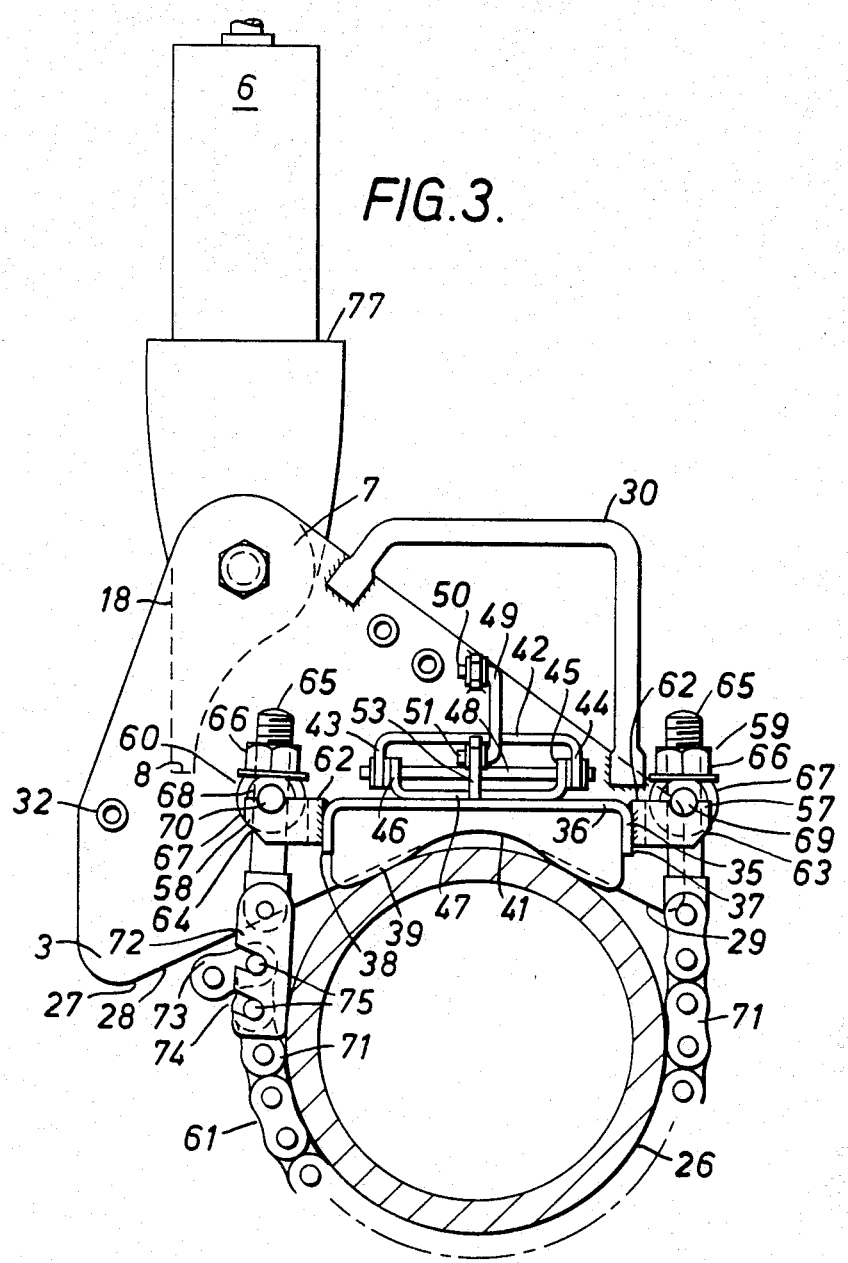

Embodiments of the invention will now be described with reference to the accompanying drawings in which:

FIG. 1 is a front elevational view of the apparatus with the flexible blanket removed, FIG. 2 is a plan view of the apparatus with the heater shown in FIG. 1 removed, shown i FIG. 3 is a sectional view along line III—III of FIG. 1

Figure 4:
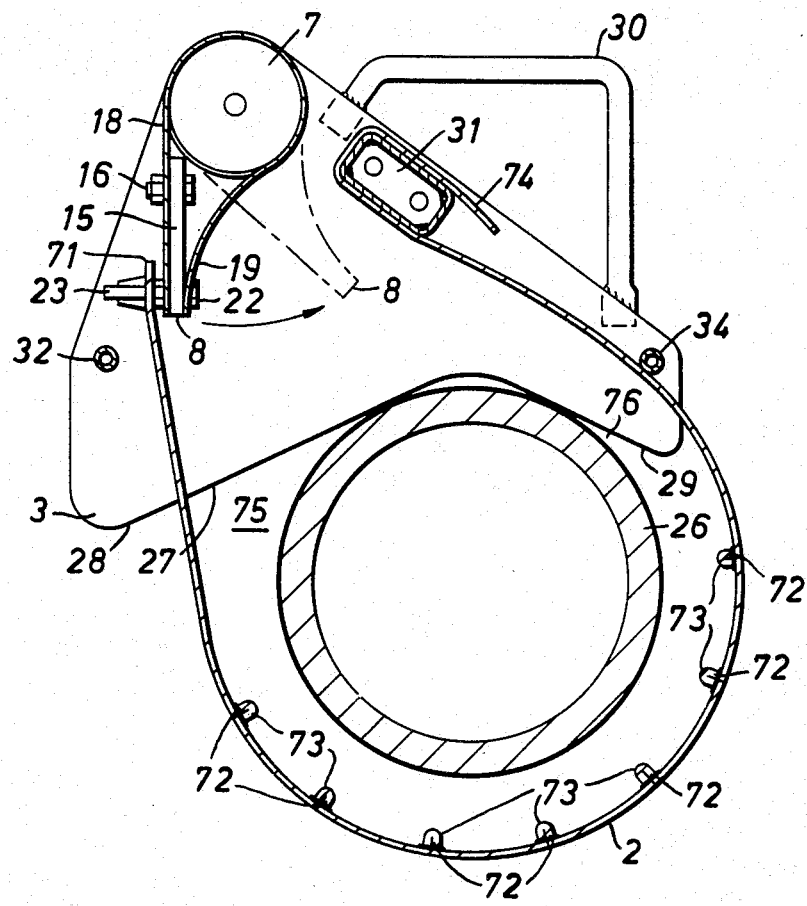

FIG. 4 is a sectional view along line IV—IV of FIG. 2.

Figure 5:
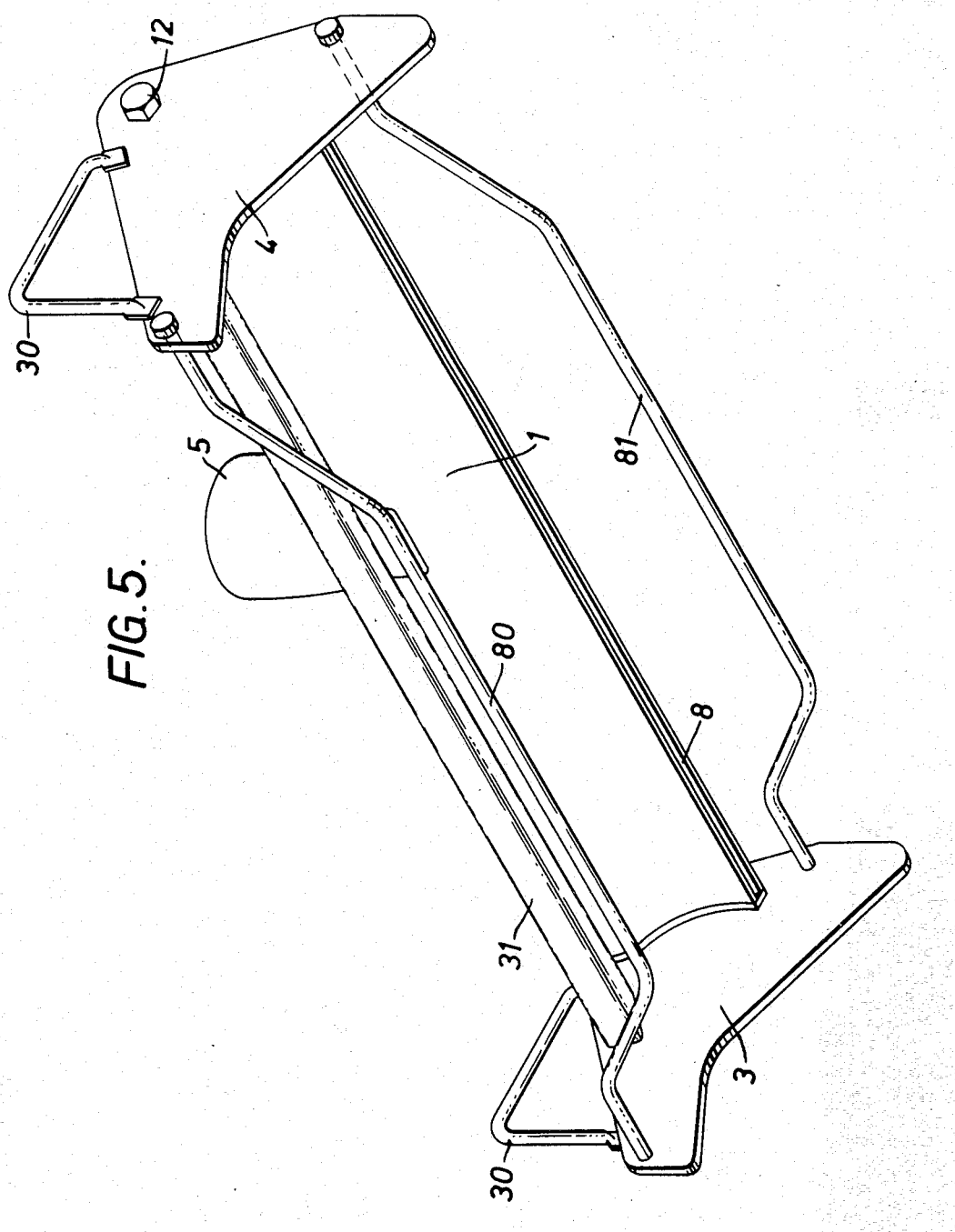

FIG. 5 is a perspective view from below of another form of the apparatus and

Figure 6:
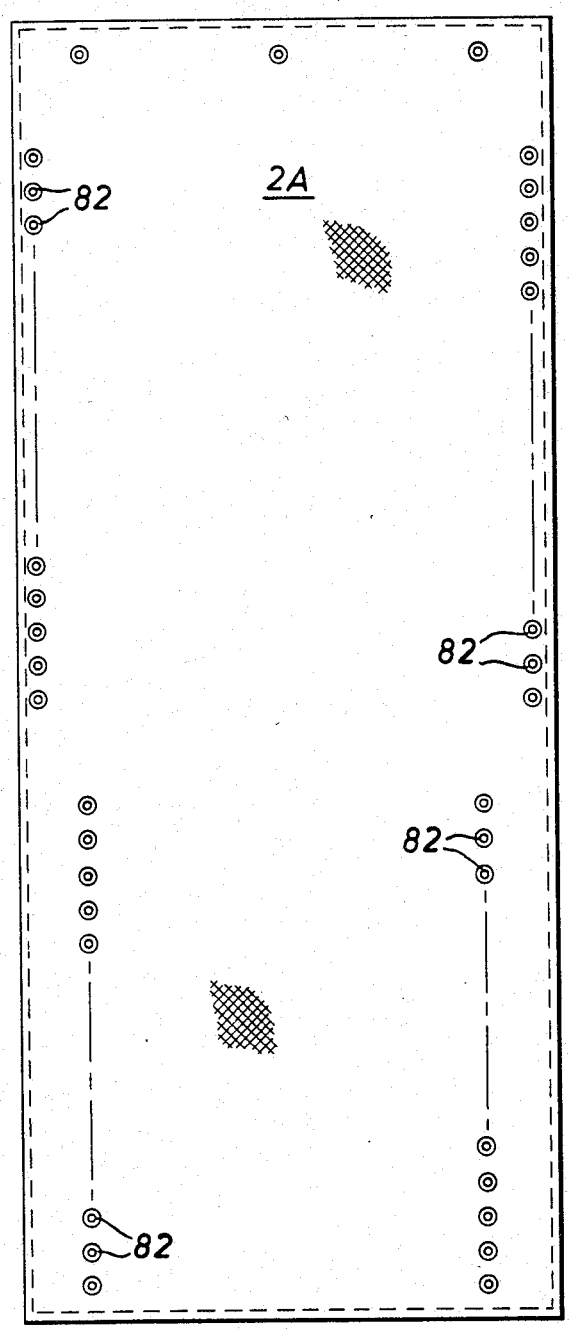

FIG. 6 is a view of another form of the blanket.

DETAILED DESCRIPTION OF THE PREFERRED EMBODIMENTS

Referring to the drawings the apparatus comprises an elongated manifold 1 attached to which is a flexible blanket 2 of a heat insulated material such as aluminised glass wool.

The manifold 1 comprises a hollow elongate body mounted at either end on mounting plates 3 and 4.

As shown in FIGS. 1 and 2 the manifold 1 is formed upwardly with a tubular inlet 5 through which hot gas can be supplied from a suitable forced draught burner 6 as will be described in more detail subsequently. The tubular inlet 5 communicates with an elongate part circular plenum chamber 7 (see FIGS. 3 and 4) which tapers downwardly to terminate in an elongated slot 8 forming an outlet for the manifold 1. The ends of the manifold 1 are closed by a pair of end plates 9 and 10 as shown most clearly in FIG. 2. These end plates 9 and 10 are themselves releasably secured to their adjacent mounting plates by bolts 11 and 12 extending into screw threaded apertures in the end plates 9 and 10 by way of larger apertures 13 and 14 in the mounting plates 3 and 4.

The manifold 1 is thus able to pivot axially about the end plates 9 and 10 in the manner shown in FIG. 4 by the arrow. Spacer plates 15 are provided at intervals along the manifold 1 to assist in maintaining the slot opening. The spacer plates 15 are each bolted by a pair of bolts 16 and 17 to the manifold 1, one bolt 16 securing the plate to a rear wall 18 of the manifold 1 and the other bolt 17 securing the plate 15 between the slot opening and passing through the front wall 19 and the rear wall 18. Three further bolts 20, 21 and 22 extend through apertures in the walls 18 and 19 at points adjacent the slot 8. The bolts 20, 21 and 22 have threaded shanks extending outwardly from the rear wall of the manifold 1. The bolts 20 to 22 in use, receive wing nuts 23,24 and 25 respectively as shown in FIGS. 2 and 4. The wing nuts 23,24 and 25 serve when tightened to secure one edge of the blanket 2 to the rear wall 18 of the manifold 1 as will subsequently be described.

Referring to FIGS. 3 and 4 the mounting plates 3 and 4 (only mounting plate 3 shown in FIGS. 3 and 4) form a saddle to enable the manifold 1 to be mounted upon and rest on the pipe wall 26. To this end, the lower wall 27 of the plates 3 and 4 is formed as an inward curve having linear portions 28 and 29 to enable the plates 3 and 4 to seat securely on the pipe wall 26 and on a wide variety of pipe wall diameters. Each of the plates 3 and 4 is also formed with a handle 30 to enable the manifold 1 to be lifted onto and away from the pipe wall 26. Extending between the plates 3 and 4 is a rectangular bar 31 which is secured to each plate 3 and 4. The bar 31 forms a post or point about which the free edge of the blanket 2 may be wrapped to secure it in position during use as shown in FIG. 4. A rod 32 also extends between the plates 3 and 4 at a position towards the rear of the plates 3 and 4 to which the rod 32 is secured. This rod 32 serves to retain the blanket 2 in position after it has been wrapped around the pipe wall 26. Similarly each plate 3 and 4 is respectively provided with a short rod 33 and 34 secured at a position towards the front of the plates 3 and 4. The rods 33 and 34 extend towards each other and provide a further retaining means for the blanket 2 after it has been wrapped around the pipe wall 26.

Referring to FIGS. 1 to 3, extending outwardly from mounting plate 3 is a further mounting or saddle 35. The saddle 35 comprises a flat plate or seat 36 having downwardly extending flanges 37 and 38 forming a recess with the seat 36. Located within the recess so formed are a pair of mounting plates 39 and 40 spaced apart along the length of the seat 36 and welded to the seat 36 and the flanges 37 and 38. As with the mounting plates 3 and 4, the lower wall 41 of the plates 39 and 40 is formed a an inward curve somewhat sharper than that in the mounting plates 3 and 4 to enable the saddle 35 to locate securely upon the pipe wall 26.

Referring to FIGS. 1 to 3, secured to the mounting plate 3 is a bracket 42 which extends outwardly from the plate 3, bracket 42 has downturned flanges 43 and 44 which engage with and are disposed outwardly on either side of the upturned flange 45 and 46 of another bracket 47 secured to the upper surface of the saddle seat 36. The brackets 42 and 47 are connected together by means of a pivot pin 48 which extends through the flanges 43,44, and 45, 56 by way of apertures located therein. This arrangement enables the mounting plate 3 to pivot about the saddle 35 by way of the pivot pin 48. Consequently the manifold 1 itself can be tilted upwardly at one end (formed by the mounting plate 3) by pivoting on the saddle 35.

Referring to FIGS. 1 to 3, the mounting plate 3 and the saddle 35 are further connected by way of a locking pin 49 which is provided with ends 50 and 51 bent at right angles to the pin axis. The pin end 50 is located within a further bracket 52 secured to the mounting plate 3 and extending outwardly therefrom. The other pin end 51 is slidably located within a locking plate 53 extending upwardly from the saddle seat 36 to which the plate 53 is secured. The plate 53 is provided with a slot 54 in which the end 51 of the pin 49 is slidable, the slot 54 having a major portion 55 extending directly away from the manifold 1 and a minor portion 56 in the form of a downward curve. The locking plate 53 enables the locking pin 49 to be releasably locked within the slot portion 56 when the pin 49 is caused to slide along the slot portion 55 to the portion 56 as a result of pivotting the manifold 1 about the saddle 35. After the pin 49 has been locked, further tilting of the manifold 1 causes it to be released from the portion 56 and the pin 49 then slides back along the slot portion 55 when the manifold 1 is lowered.

Referring to FIG. 3, in particular, extending outwardly from the flanges 37 and 38 of the saddle seat 36 are lugs 57 and 58 respectively secured to the flanges 37 and 38 to engage the clamps 59 and 60 located in the ends of a chain 61 adapted for clamping the saddle 35 upon the pipe wall 26. Each lug 57 and 58 comprises a rear portion 62 welded to its respective flange and a pair of outwardly extending end portions 63 and 64. Each end portion 63 and 64 is formed in its uppermost surface with a circular recess to receive the clamps 59 and 60.

Each clamp 59 and 60 comprises a bolt 65 whose outer end is threaded to receive a clamping nut and washer assembly 66. Each clamp 59 and 60 also includes a clamping boss 67 comprising a part cylindrical member 68 and having respectively pins 69 and 70 extending axially from either end thereof. The pins 69 and 70 are adapted to be located in the respective recesses formed in the end portions 63 and 64 of the lugs 57 and 58. Each part cylindrical member 68 of the bosses 67 is also provided with an aperture extending diametrically therethrough so that the bore 67 can be located slidably on the bolt 65. The part cylindrical member 68 of each bolt 67 is also provided with a flat surface for engagement with the nut and washer assembly 66.

The chain 61 itself is similar to a bicycle chain and comprises a multiplicity or interconnected links 71. Clamp 59 is directly connected to its adjacent link while clamp 60 is pivotally connected to one end of an adjuster plate 72. The adjuster plate 72 is provided with a pair of slots 73 and 74 arranged to an acute angle to the longitudinal axis of the plate 72. The plate 72 is connected to the chain 61 by means of the slots 73 and 74 in which connecting pins 75 of a link 71 or of adjacent links can be located. The length of the chain 61 located between the clamps 59 and 60 can therefore be adjusted by selection of an appropriate link or links for location in the adjuster plate slots 73 and 74. The length of the chain can therefore be selected to suit the diameter of the pipe wall 26 under repair so that the saddle 35 can be clamped thereto with the optimum clamping force. To clamp the saddle 35 onto the pipe wall 26 (thereby clamping the mounting plates 3 and 4 and the manifold 1 also) the manifold assembly is located upon the pipe wall 26 in the manner shown in the drawings, the chain 61 and the clamps 59 and 60 at this stage of course being removed from the lugs 57 and 58. The chain length is adjusted to suit the diameter of the pipe wall as previously described and the boss 67 is fitted onto the bolt 65 of clamp 60. The boss pins 69 and 70 are then located in the recesses formed in the end portions of the lug 57 and the respective nut and washer assembly 66 is then fitted onto the threaded end of the bolt 65 and engaged with the flat boss surface. The chain 61 is then wrapped around the pipe wall 26 and the boss 67 of clamp 59 is fitted onto the respective bolt 65 so that the boss pins 69 and 70 are located in the recesses formed in the end portions of the lug 57. The nut and washer assembly 66 is then fitted into the threaded end of the bolt 65 in the clamp 59 and engaged with the flat boss surface. The chain 61 is now securely fastened around the pipe wall 26 to securely mount the saddle 35 and thereby the manifold 1.

The blanket 2 has adjacent its rear edge 71 three apertures (not shown) for enabling the blanket 2 to be secured to the manifold 1 via the bolts 20 to 22 which, in use, extend through the apertures. The wing nuts 23 to 25 are fitted onto the bolts 20 to 22 to hold the blanket in place.

Referring to FIG. 4, as a modification each side edge of the blanket 2 (only one shown in the Figure) is gathered to reduce the length of the blanket 2 at its side edges compared to the overall length measured at say its centre. For this purpose a number of spaced darts or clips 72 are secured to the edge to provide small folds 73 in the blanket side edges. Thus when the blanket 2 is wrapped around the pipe wall 26, it tends to form an envelope to trap heat within the blanket 2.

In use, of the apparatus for repair purposes, the manifold is first of all positioned on the pipe wall 26 which is to be repaired in the manner shown and is clamped thereto by the clamping chain 61 in the manner previously described. The blanket 2 is then secured at its rear edge 71 to the manifold 1 as shown in FIG. 4 and is wrapped several times around the bar 31 to secure the blanket 2 in place. The blanket 2 now forms a heat shroud around the pipe wall 26 with, as shown in FIG. 4, openings 75 and 76 to receive hot gas from the outlet 8 of the manifold 1 and to discharge the gas after circulation around the wall of the pipeline 26.

Referring to FIGS. 1 and 3 the outlet end 77 of a suitable forced draught burner 6, previously ignited preferably to provide a low temperature exhaust gas, is then located in the tubular inlet 5 of the manifold 1. A suitable burner is shown and described in our copending UK Patent Application No. 8130700. Hot gas is then injected into the manifold 1 so that it issues through the manifold outlet 8 into one of the openings 75 or 76 formed by the blanket heat shroud. In FIG. 4 the exhaust gas is shown entering opening 75 and discharging from opening 76. The hot gas is allowed to circulate around the wall of the pipeline 26 for some minutes to heat the wall. To achieve more uniform heating of the pipeline wall 26 the manifold 1 can be normally axially swivelled after some minutes heating from the position shown in full line in FIG. 4 to the position shown in broken line. Hot gas now enters the opening 76 and discharges from the opening 75 so that the hot gas circulates around the pipe wall 26 in the opposite direction. When the external surface of the pipe wall 26 has reached the desired temperature (usually in the region of 60° C. for most applications using heat shrinkable plastic sleeves) the burner 6 i turned off and is removed from the inlet 5. The free edge 74 of the blanket 2 is then detached from its securing bar 31 and allowed to hang loose. The manifold 1 is then raised at the end adjacent mounting plate 4 so that is pivots about the pivot pin 48 via the mounting plate 3 until the locking pin 49 engages in the curved part 56 of the locking slot 54 in locking plate 53. The manifold 1 is thus spaced away from the pipe wall 26 at an angle thereto so that access can be gained thereto to wrap the heat shrinkable plastics sleeve 78 in the conventional manner around that portion of the pipe wall 26 from which gas is leaking (see FIGS. 1 and 2 where the leak is commonly found is at the joint 79 between two pipes).

A suitable heat shrinkable sleeve 78, such as the Raychem GRSM 60-600 sleeve, is then wrapped around the pipe wall 26 and is zipped up. The manifold 1 is then lifted upwardly slightly to release the locking pin 49 from the curved slot 56 and the manifold 1 is then lowered into position once again, the pin 49 sliding back along slot portion 55 to its rest position. The blanket 2 is then wrapped around the pipe once again and secured to the bar 31.

The ignited burner 6 is then reinserted into the tubular inlet 5 and injects hot gas into the manifold 1 as previously described so that the hot gas can circulate around the enclosure formed by the blanket 2. As previously mentioned the manifold 1 can be axially swivelled between the two portion shown in FIG. 4 to provide hot gas circulation in opposite directions around the pipe wall 26 for several minutes until the operators are satisfied that the sleeve 78 is cured and forms a leak tight shrink fit around the pipe wall 26. The blanket 2 is then freed from the bar 31 and the clamping chain 61 is removed so that the manifold 1 can be removed so that the manifold 1 can be removed from the pipe wall 26.

Referring to FIG. 5 the apparatus is similar to that shown in FIGS. 1 to 4 except that rod 32 has been replaced by a bow or stay 80 while the rods 33 and 34 are replaced by a bow or stay 81. The bows 80,81 extend between the plates 3 and 4 and are secured thereto by nuts. The blanket in use passes around these bows 80,81 so that the upper portion of the blanket is spaced from the pipeline. The bows 80,81 may be rotated about their axis to alter the position of the central stay and the bows 80,81 locked in their new position. This enables the spacing of the blanket from the pipeline to be altered.

Referring to FIG. 6, the blanket 2 is provided with two sets of eyes 82 adjacent each edge thereof. A cord may be threaded through alternate eyes 82 to pull the edges towards the pipeline after the blanket has been wrapped therearound so as to form an enclosed heat shroud.

The present apparatus enables the time of each repair to be cut by up to 50% compared with the time taken when conventional heating apparatus is used. The principal advantage of the present apparatus however is that lateral access can readily be obtained to pipe leaks however restricted or confined is the situation of the leak to be repaired and repairs can be made in situations which are virtually impossible with previous techniques.

I claim:

1. Apparatus for applying heat to a portion of a pipeline, the apparatus comprising an elongate manifold for mounting on the pipeline, the manifold having an inlet for receiving hot gas and an outlet for discharging the gas along the portion of the pipeline to be heated, means for releasably mounting the manifold on the portion of the pipeline to be heated and a flexible blanket of heat insulated material which is wrappable around the portion of the pipeline to be heated at a spacing therefrom so that a heat shroud encircling at least a major part of the pipeline circumference is formed between the blanket and the adjacent surface of the pipeline, the opposite ends of the blanket being attachable respectively to the manifold and the manifold mounting means in such a manner that the heat shroud has at the manifold end an opening for receiving hot gas from the manifold and at the manifold mounting means end an opening for discharging the gas after circulation around the surface of the pipeline, and one of said ends of said blanket being releasably attachable so as to permit the blanket to be readily wrapped around and unwrapped from the pipeline, wherein those edges of the blanket forming the edges of the heat shroud are gathered so that their length is reduced in comparison to the actual length of the blanket to enable the edges to grip the walls of said pipeline.

2. Apparatus as claimed in claim 1 in which the manifold inlet communicates with the outlet by way of an elongated plenum chamber.

3. Apparatus as claimed in claim 1 in which the blanket is provided with a series of eyes extending along the edges of the blanket which are to form the heat shroud and a cord is threaded alternately through each series of eyes to pull the edges towards the pipeline when the blanket is wrapped therearound.

4. Apparatus as claimed in claim 1 in which the manifold outlet comprises an elongated slot.

5. Apparatus as claimed in claim 1 in which the ends of the manifold are secured to mountings adapted to locate the manifold on the pipeline wall.

6. Apparatus as claimed in claim 5 in which the manifold is adapted for swivelling axially on its mountings so that the position of manifold outlet can be varied to direct gas into either of the openings in the heat shroud.

7. Apparatus as claimed in claim 5 in which one of the mountings includes two pivotally connected portions, one of which is secured to the manifold so that when in situ on the pipeline the manifold can be tilted away from the pipeline by pivoting at one end about the other portion of the mounting.

8. Apparatus as claimed in claim 7 in which the mounting portions include releasable locking means for locking the manifold in its tilted position.

9. Apparatus as claimed in claim 7 in which the other portion of the mounting includes means for releasably securing the apparatus to the pipeline.

10. Apparatus as claimed in claim 3 in which the mountings are provided with means for securing the other edge of the blanket after it has been wrapped around the pipe wall.

11. Apparatus as claimed in claim 5 in which means extending between the mountings is provided to space a portion of the blanket from the pipeline when the blanket is wrapped around the pipeline.

12. Apparatus as claimed in claim 11 in which the spacing means is adapted to adjust the spacing between the blanket and the pipeline.

13. Apparatus as claimed in claim 11 in which the spacing means is adapted to adjust the spacing between the blanket and the pipeline.

14. In combination, a pipeline and an apparatus for applying heat to a portion of the pipeline, the apparatus comprising an elongate manifold, means releasably mounting said manifold on the pipeline, the manifold having an inlet for receiving hot gas and an outlet for discharging the gas along the portion of the pipeline and including a flexible blanket of heat insulated material secured at one edge thereof to the manifold and wrapped around said portion of the pipeline to form therearound a heat shroud having openings for respectively receiving hot gas from the manifold outlet and discharging the gas after circulation around the wall of the pipeline, the other end of flexible blanket being releasably secured to said manifold mounting means to permit the blanket to be readily wrapped around and unwrapped from said pipeline, wherein those edges of the blanket forming the edges of the heat shroud are gathered so that their length is reduced in comparison to the actual length of the blanket to enable the edges to grip the walls of the pipeline.

15. Apparatus for applying heat to a portion of a pipeline, the apparatus comprising an elongate manifold for mounting on the pipeline, the manifold having an inlet to receive hot gas and an outlet to discharge the gas along the portion of the pipeline to be heated, means for releasably mounting the manifold on the portion of the pipeline to be heated and a flexible blanket of heat insulated material which is wrappable around the portion of the pipeline to be heated at a spacing therefrom so that a heat shroud encircling at least a major part of the pipeline circumference is formed between the blanket and the adjacent surface of the pipeline, the opposite ends of the blanket being attachable respectively to the manifold and the manifold mounting means in such a manner that the heat shroud has at the manifold end an opening to receive hot gas from the manifold and at the manifold mounting means end an opening to discharge the gas after circulation around the surface of the pipeline, those edges of the blanket forming the edges of the heat shroud being gathered so that their length is reduced in comparison to the actual length of the blanket to enable the edges to grip the walls of a pipeline.

* * * * *